(12) United States Patent
Rahman

(10) Patent No.: US 12,193,081 B2
(45) Date of Patent: Jan. 7, 2025

(54) EDGE COMPUTING IN 4G AND 5G CORES BASED ON APPLICATION USAGE

(71) Applicant: T-Mobile Innovations LLC, Overland Park, KS (US)

(72) Inventor: Muhammad Tawhidur Rahman, Sammamish, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 385 days.

(21) Appl. No.: 17/696,480

(22) Filed: Mar. 16, 2022

(65) Prior Publication Data

US 2023/0300913 A1 Sep. 21, 2023

(51) Int. Cl.
*H04W 76/12* (2018.01)
*H04L 67/5681* (2022.01)

(52) U.S. Cl.
CPC ......... *H04W 76/12* (2018.02); *H04L 67/5681* (2022.05)

(58) Field of Classification Search
CPC ..... H04L 67/10; H04L 67/5681; H04W 76/12
See application file for complete search history.

(56) References Cited

U.S. PATENT DOCUMENTS

| | | | | |
|---|---|---|---|---|
| 10,326,889 B2* | 6/2019 | Albanes | ................. | H04L 12/14 |
| 10,445,326 B2* | 10/2019 | Glover | ............. | G06F 16/24575 |
| 10,817,424 B1* | 10/2020 | Amrani | ............... | G06F 12/0813 |
| 2013/0144986 A1* | 6/2013 | Yamada | ................. | H04H 60/13 |
| | | | | 709/219 |
| 2014/0007192 A1* | 1/2014 | Qureshi | ............... | H04W 12/30 |
| | | | | 726/3 |
| 2015/0046564 A1* | 2/2015 | Kim | ....................... | H04L 67/10 |
| | | | | 709/217 |
| 2017/0126616 A1* | 5/2017 | Halley | ................ | H04L 61/4552 |
| 2017/0289037 A1* | 10/2017 | Seo | ......................... | H04B 7/155 |
| 2023/0300913 A1* | 9/2023 | Rahman | ............. | H04L 67/5681 |
| | | | | 370/328 |

* cited by examiner

Primary Examiner — Raj Jain
(74) Attorney, Agent, or Firm — Shook, Hardy & Bacon L.L.P.

(57) ABSTRACT

Systems and methods are provided herein to perform edge computing in 4G and 5G cores based on application usage. Networks identify highly requested content at an access point and may use network data analytics functions to identify which content is popular in the area served by an access point. The highly requested content may be applications, webpages, or similar content. Once the highly requested content has been identified, tunneling to at least one application server to download the highly requested content occurs. The content may then be stored in a dynamically caching server near the access point. The network data analytics operations to identify highly requested content may be performed on a periodic basis, and content that no longer meets a predetermined threshold may be flushed from the dynamically caching server.

11 Claims, 4 Drawing Sheets

EDGE COMPUTING IN 4G AND 5G CORES BASED ON APPLICATION USAGE

BACKGROUND

Edge computing keeps content geographically closer to end users so that the latency to deliver the content to mobile devices is optimized. Moving content closer to users improves users' access to popular third party applications for content streaming. Popular third party applications may be hosted on servers in operators' network nodes or other operating locations. Such locations could host servers for multiple third party applications, however, this takes up space and does not provide optimal service to customers far from the server location. Application providers could deploy topologies geographically distributed across a network operator's network, however, this approach does not function well long term as mobile networks continue to expand. A server well placed at one point in time on a network could over time suffer performance degradation and increased latency as the network continues to grow. In addition, coverage needs between application providers and networks may not match well, resulting in long latency for some users. A framework for edge computing based on a set of servers that dynamically download and store heavily used applications and webpage objects is discussed herein.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods and systems for edge computing in 4G & 5G cores based on application usage is provided. The method provides for identifying highly requested content. The highly requested content may be applications, webpages, or similar online content. The mobile network may identify the highly requested content using network data analytics tools. Once the highly requested content is identified, the methods continues with tunneling to at least one application server to download the highly requested content. After downloading the highly requested content is stored near an access point. The highly requested content may be stored in a dynamic caching server.

The present disclosure also provides a device for edge computing. The device includes a display, a processor and a memory that stores executable instructions that when executed by the processor, perform the following operations: identifying highly requested content at an access point; tunneling to at least one application server to download the highly requested content. After downloading the highly requested content may be stored near the access point.

In addition, the present disclosure provides a system for edge computing in 4G and 5G cores. The system includes a processor and one or more computer storage hardware devices storing computer usable instructions, that when used by the processor, cause the processor to perform the following operations: identifying highly requested content at an access point; tunneling to at least one application server to download the highly requested content; and storing the highly requested content near the access point.

The present systems and methods address the shortcomings of current and old methods of planning and implementing edge computing in 4G and 5G networks. The systems and methods create a dynamic framework for edge computing. The set of servers dynamically select, download, and store a set of heavily used applications and associated web page objects.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
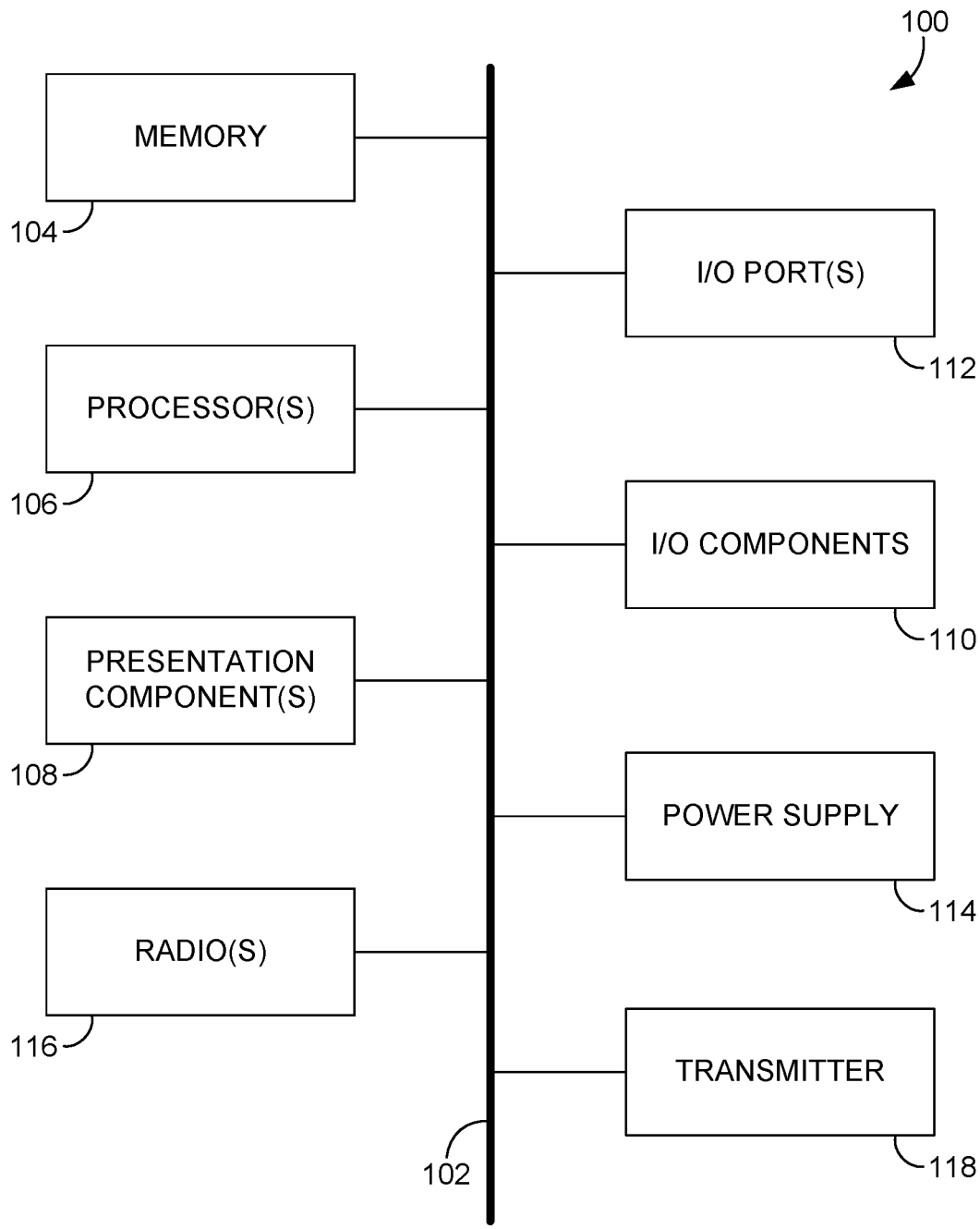
FIG. 1 depicts a diagram of an exemplary network environment in which implementations of the present disclosure may be employed, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Various technical terms are used throughout this description. An illustrative resource that fleshes out various aspects of these terms can be found in Newton's Telecom Dictionary, 25th Edition (2009).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., access point, node, cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, and the like); however, in other aspects, a single access point may communicate with a UE according to multiple protocols. As used herein, a base station may comprise one access point or more than one access point. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an EnodeB). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station or access point.

In aspects, a UE provides UE data including location and channel quality information to the wireless communication network via the access point. Location information may be based on a current or last known position utilizing GPS or other satellite location services, terrestrial triangulation, an access point's physical location, or any other means of obtaining coarse or fine location information. Channel quality information may indicate a realized uplink and/or downlink transmission data rate, observed signal-to-interference-plus-noise ratio (SINR) and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the access point or at the individual antenna array of the access point. In other aspects, the processing of said information may be done remotely.

A service state of the UEs may include, for example, an in-service state when a UE is in-network (i.e., using services of a primary provider to which the UE is subscribed to, otherwise referred to as a home network carrier), or when the UE is roaming (i.e., using services of a secondary provider providing coverage to the particular geographic location of the UE that has agreements in place with the primary provider of the UE). The service state of the UE may also include, for example, an emergency only state when the UE is out-of-network and there are no agreements in place between the primary provider of the UE and the secondary provider providing coverage to the current geographic location of the UE. Finally, the service state of the UE may also include, for example, an out of service state when there are no service providers at the particular geographic location of the UE.

In accordance with aspects herein, a mobile network operator may preserve a set of servers that dynamically select, download, and store heavily used applications and associated webpage objects, such as http objects, graphics interchange format (GIF), joint photographic experts group (JPEG), video, cascading style sheets (CSS), and others. Mobile operators may use network intelligence from nodes to better understand which contents are frequently requested. Popular content may change over time and different locations may have different preferences based on demographics, as well as social and behavioral differences. The density of cell towers in an area may also influence which applications are stored in which locations. Mobile network providers see these differences across their networks.

In a 5G network the network data analytics function (NDAWF) tracks mobility, usage, and real time dynamics of pattern recognition for the overall behavior of customers. The NDAWF allows mobile network operators to determine which contents may be candidates for edge computing.

In accordance with a first aspect of the present disclosure, a system that takes advantage of the NDAWF functionality determines which contents are suitable for edge computing and then uses the core network platform to set up a communication flow with the respective application servers to request the heavily used contents be downloaded to the mobile network operator's premises. A tunnel may be created with the application servers to pull the needed files and then transfer it back to empty edge computing servers owned by the mobile network operator.

The edge computing servers may be located near the user plane function (UPF) hardware. In some implementations the edge computing servers may be located inside the UPF, depending on the mobile network operator's implementation choices. The edge computing servers do not permanently store the high frequency content. Over time the highly requested content may change and the edge computing servers may be flushed to provide for storage of newly popular content. The actual local use patterns may change with each UPF location A second aspect of the present disclosure is directed to a computer implemented method for edge computing in a mobile network. The method comprises identifying highly requested content at an access point. Once the highly requested content has been identified, tunneling to at least one application server is performed to download the highly requested content. After downloading the highly requested content is stored near the access point.

Another aspect of the present disclosure is directed to a device for edge computing. The device includes a display, a processor, and a memory that stores executable instructions that when executed by the processor perform operations. The operations include: identifying highly requested content at an access point; tunneling to at least one application server to download the highly requested content; and storing the highly requested content near an access point.

A further aspect of the present disclosure is directed to a system for edge computing in a mobile network. The system includes a processor and one or more computer storage hardware devices storing computer-usable instructions that, when executed by the processor, cause the processor to: identify highly requested content at an access point; tunnel to at least one application server to download the highly requested content; and store the highly requested content near an access point.

Turning to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 112, I/O components 110, radio 116, transmitter 118, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 110. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 110. One or more presentation components 108 present data indications to a person or other device. Exemplary one or more presentation components 108 include a display device, speaker, printing component, vibrating component, etc. I/O ports 112 allow computing device 100 to be logically coupled to other devices including I/O components 110, some of which may be built into computing device 100. Illustrative I/O components 110 include a microphone, joystick, game pad, satellite dish, scanner, printer, wireless device, etc.

The radio 116 represents one or more radios that facilitate communication with a wireless telecommunications network. While a single radio 116 is shown in FIG. 1, it is contemplated that there may be more than one radio 116 coupled to the bus 102. In aspects, the radio 116 utilizes a transmitter 118 to communicate with the wireless telecommunications network. It is expressly conceived that a computing device with more than one radio 116 could facilitate communication with the wireless telecommunications network via both the first transmitter 118 and an additional transmitters (e.g. a second transmitter). Illustrative wireless telecommunications technologies include CDMA, GPRS, TDMA, GSM, and the like. The radio 116 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
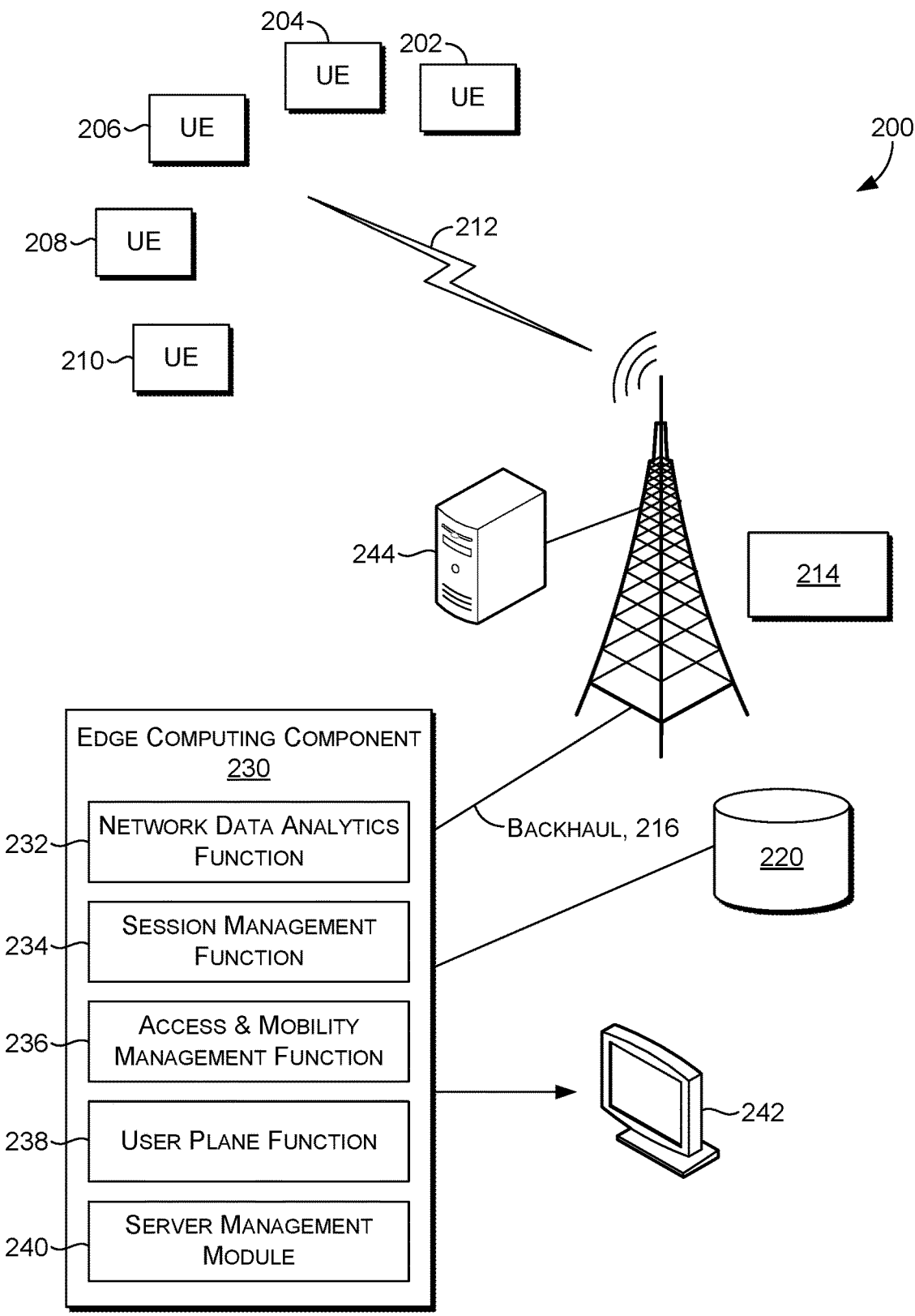
FIG. 2 depicts a computing environment suitable for use in implementations of the present disclosure, in accordance with aspects herein.

Next, FIG. 2 provides an exemplary network environment in which implementations of the present disclosure may be employed. Such a network environment is illustrated and designated generally as network environment 200. Network environment 200 is not to be interpreted as having any dependency or requirement relating to any one or combination of components illustrated.

Network environment 200 includes user devices (UE) 202, 204, 206, 208, and 210, access point 214 (which may be a cell site, base station, or the like), and one or more communication channels 212. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 100) that communicates via wireless communications with the access point 214 in order to interact with a public or private network.

In some aspects, each of the UEs 202, 204, 206, 208, and 210 may correspond to computing device 100 in FIG. 1. Thus, a UE can include, for example, a display(s), a power source(s) (e.g., a battery), a data store(s), a speaker(s), memory, a buffer(s), a radio(s) and the like. In some implementations, for example, a UEs 202, 204, 206, 208, and 210 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, UEs 202, 204, 206, 208, and 210 in network environment 200 can optionally utilize one or more communication channels 212 to communicate with other computing devices (e.g., a mobile device(s), a server(s), a personal computer(s), etc.) through access point 214. The network environment 200 may be comprised of a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network environment 200 can include multiple networks, as well as being a network of networks, but is shown in more simple form so as to not obscure other aspects of the present disclosure.

The one or more communication channels 212 can be part of a telecommunication network that connects subscribers to their immediate telecommunications service provider (i.e., home network carrier). In some instances, the one or more communication channels 212 can be associated with a telecommunications provider that provides services (e.g., 3G network, 4G network, LTE network, 5G network, and the like) to user devices, such as UEs 202, 204, 206, 208, and 210. For example, the one or more communication channels may provide voice, SMS, and/or data services to UEs 202, 204, 206, 208, and 210, or corresponding users that are registered or subscribed to utilize the services provided by the telecommunications service provider. The one or more communication channels 212 can comprise, for example, a 1× circuit voice, a 3G network (e.g., CDMA, CDMA2000, WCDMA, GSM, UMTS), a 4G network (WiMAX, LTE, HSDPA), or a 5G network.

In some implementations, access point 214 is configured to communicate with a UE, such as UEs 202, 204, 206, 208, and 210, that are located within the geographic area, or cell, covered by radio antennas of access point 214. Access point 214 may include one or more base stations, base transmitter stations, radios, antennas, antenna arrays, power amplifiers, transmitters/receivers, digital signal processors, control electronics, GPS equipment, and the like. In particular, access point 214 may selectively communicate with the user devices using dynamic beamforming.

As shown, access point 214 is in communication with an edge computing component 230 and at least a network database 220 via a backhaul channel 216. The access point may also host a dynamic caching server 244 that stores applications and associated webpage content that are frequently requested by users in the vicinity of access point 214. As the UEs 202, 204, 206, 208, and 210 collect individual status data, the status data can be automatically communicated by each of the UEs 202, 204, 206, 208, and 210 to the access point 214. Access point 214 may store the data communicated by the UEs 202, 204, 206, 208, and 210 at a network database 220. Alternatively, the access point 214 may automatically retrieve the status data from the UEs 202, 204, 206, 208, and 210, and similarly store the data in the network database 220. The data may be communicated or retrieved and stored periodically within a predetermined time interval which may be in seconds, minutes, hours, days, months, years, and the like. With the incoming of new data, the network database 220 may be refreshed with the new data every time, or within a predetermined time threshold so as to keep the status data stored in the network database 220 current. For example, the data may be received at or retrieved by the access point 214 every 10 minutes and the data stored at the network database 220 may be kept current for 30 days, which means that status data that is older than 30 days would be replaced by newer status data at 10 minute intervals. As described above, the status data collected by the UEs 202, 204, 206, 208, and 210 can include, for example, service state status, the respective UE's current geographic location, a current time, a strength of the wireless signal, available networks, and the like.

The edge computing component 230 comprises various engines including a network data analytics function (NWDAF) 232, a session management function (SMF) 234, an access and mobility management function (AMF) 236, a user plane function (UPF), and a server management module 240. All determinations, calculations, data, and analytical results produced by the NWDAF 232, SMF 234, AMF 236, UPF 238, and server management module 240 may be stored at the network database 220. Although the edge computing component 230 is shown as a single component comprising the NWDAF 232, the SMF 234, the AMF 236, the UPF 238, and the server management module 240, it is also contemplated that each of the NWDAF 232, the SMF 234, the AMF 236, the UPF 238, and the server management module 240 may reside at different locations, be its own separate entity, and the like, within the home network carrier system.

The edge computing component 230 allows a mobile network operator to host an application server, such as dynamic caching server 244 in the mobile operator's location. This brings the dynamic caching server 244 closer to the UEs, such as UEs 202, 204, 206, 208, and 210, reducing latency for the UEs. The dynamic caching server 244 may dynamically select, download, and store heavily used applications and associated webpage objects. The associated webpage objects may include: GIF, JPEG, video, and CSS, to name a few. To achieve this, the mobile network operator uses network intelligence gain from the various nodes, such as NWDAF 232, SMF 234, AMF 236, and UPF 238. Each of these nodes provides important information on which contents are highly requested and should be deployed at a server, such as dynamic caching server 244, for edge computing.

The NWDAF 232 is a 3GPP standard method that is used to collect data from UEs, network functions, and network operations. In addition, the NWDAF 232 also collects data on network administration, maintenance systems and may collect this information from 5G core, cloud, and edge networks. The collected analytical data may be used as part of the determination of which applications to deploy in dynamic caching server 244. The NWDAF 232 provides analytical information as part of the edge computing component, but may be located apart from other functional blocks of the edge computing component 230.

In operation, the NWDAF 232 provides a load balancing function and in the context of this disclosure may refine, based on user subscriptions, the applications and webpage content that is stored in the dynamic caching server 244. The NWDAF 232 provides the analysis of what content is highly requested in the area served by access point 214.

The SMF 234 is primarily responsible for interacting with the decoupled data plane. In addition, the SMF 234 also creates, updates, and removes protocol data unit (PDU) sessions and manages context with the UPF 238. The SMF 234 may also be located separately from other functional blocks of the edge computing component 230.

The AMF 236 receives all connection and session related information from the UE, but is responsible only for handling connection and mobility management tasks. Messages relating to session management are forwarded over a reference interface to the SMF 234. The AMF 236 performs the role of access point to the 5G core, and as such terminates the radio access network (RAN) control plane and UE traffic that originates on reference interfaces. IN addition, the AMF 236 implements ciphering and integrity protection algorithms, which are involved in the UE authorization process. The AMF 236 may also be located separately from other functional blocks of the edge computing component 230.

The UPF 238 allows packet gate control and user plane functions, enabling the data forwarding component to be decentralized. This allows packet processing and traffic aggregation to be performed closer to the network edge. In aspects disclosed herein, the UPF 238 assists in providing frequently requested applications and webpages in conjunction with the edge computing component 230. The UPF 238 provides the interconnect between the mobile infrastructure and the data network, including encapsulation and decapsulation of tunneling protocols, such as the General Packet Radio Service (GPRS) tunneling protocol. In operation, the UPF 238 may create a tunnel with application servers, such as dynamic caching server 244. The UPF 238 may also be located separately from other functional blocks of the edge computing component 230.

The server management module 240 manages the applications and webpage content that may be stored locally, such as at dynamic caching server 244, located at access point 214. The access point 214 may be in communication with other access points, which may also have servers located at or near the access point. In operation, the server management module 240 manages the dynamic caching servers, which may be located at access points. The highly requested content may change over time, causing some applications and webpages to consume storage space at dynamic caching server 244 that may no longer be highly requested. To overcome this issue, the server management module 240 periodically flushed the dynamic caching server 244 of stale content, making way for new application storage. The retention threshold may be configured based on network intelligence data on which applications and webpages are highly requested in the area served by an access point 214. The retention threshold may also be based on a date, time, number of requests falling before a predetermined threshold, or a more recent identification of highly requested content. Before storing content on the dynamic caching server 244 a security check may be performed, to ensure that permissions are in place before edge computing operations occur.

Figure 3:
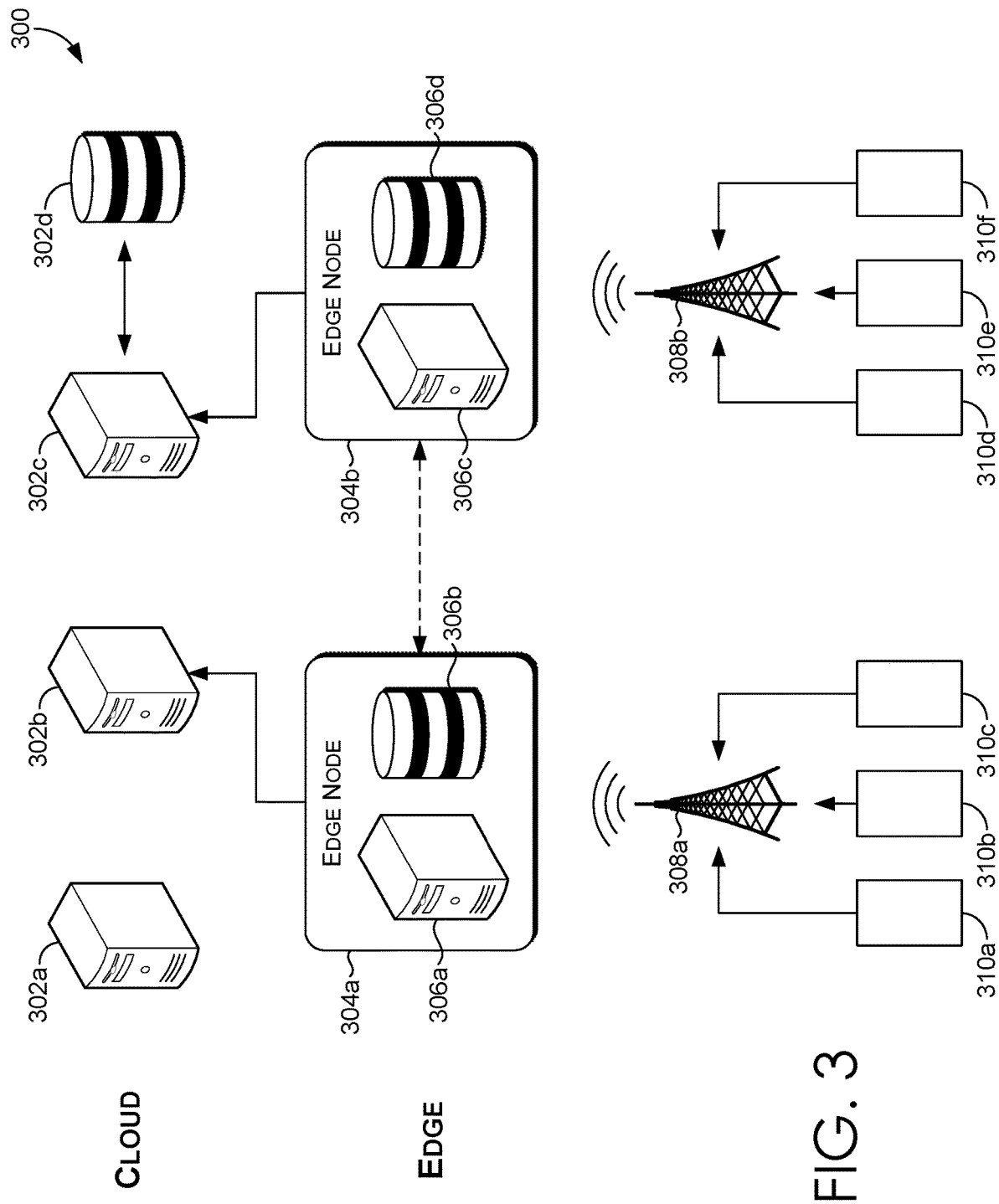
FIG. 3 depicts an edge computing infrastructure in which implementations of the present disclosure may be employed, in accordance with aspects herein.

FIG. 3 depicts an edge computing infrastructure in which implementations of the present disclosure may be employed. Edge computing is a distributed computing paradigm that brings computation, and here, delivery of content, closer to the users of data and content. In an edge computing system 300 there are cloud servers 302a-302c, which may host a variety of application programs and webpage content. The content may be hosted at an edge node 304a or 304b. The edge nodes 304a and 304b may be in communication with servers, as shown by edge node 304a in communication with server 302b and edge node 304b in communication with 302c. The cloud servers 302a-302c may also communicate with a host 302d. Host 302d is depicted as communicating with server 302c.

The edge nodes 304a and 304b may contain edge node servers 306a and host 306b, for edge node 304a with server 306c and host 306d for edge node 304b. The hosts 306b and edge node host 306d may remotely host applications and webpages. Edge nodes 304a and 304b may also share content. The distributed nature of edge computing causes data to travel between different distributed nodes connected through the internet and this requires special encryption and security mechanisms that are independent of the cloud.

Access points 308a and 308b may also communicate wirelessly with edge nodes 304a and 304b. Users 310a-310f may request specific content from the edge node servers 306a and edge node host 306b, depending on which access point 308a or 308b is serving at the time the request is made.

Figure 4:
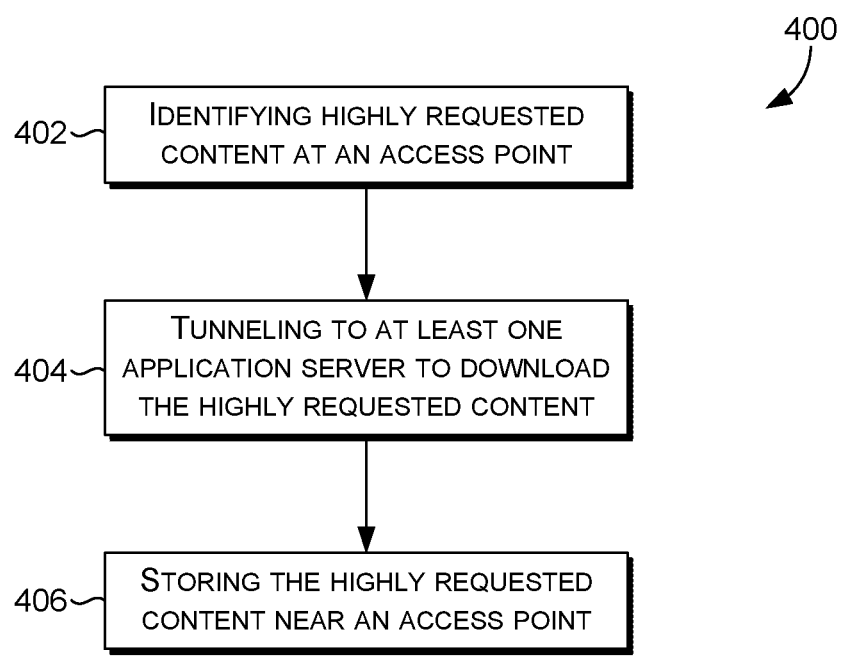
FIG. 4 is a flowchart of a method of edge computing in 4G & 5G cores based on application usage, in accordance with aspects herein.

FIG. 4 is a flowchart of a method of edge computing in 4G & 5G cores based on application usage. The method 400, begins with identifying highly requested content at an access point in block 402. The highly requested content may be applications or webpage content. Popular applications may include streaming applications, videos, games, and the like. Once the content has been identified, the method continues with tunneling to at least one application server to download the highly requested content in block 404. The tunneling may be to a host application server, such as a widely known search or streaming application. After tunneling, in block 406 storing the highly requested content near an access point occurs. The content may be stored in a dynamic caching server, which may be located at an access point or at a suitable nearby location. Once the application or webpage is downloaded to the dynamic caching server, the content may be enjoyed by network subscribers with less latency.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A computer-implemented method for edge computing in a mobile network, comprising:
   identifying highly requested content at an access point;
   tunneling to at least one application server to download the highly requested content;
   storing the highly requested content near the access point, wherein the highly requested content is stored in a dynamic caching server; and
   dynamically flushing the dynamic caching server of the highly requested content when a number of requests for the highly requested content falls below a predetermined threshold.

2. The computer implemented method of claim 1, wherein the predetermined threshold is based on a number of requests for the highly requested content.

3. The computer implemented method of claim 1, wherein the predetermined threshold is based on an expiration of a time period.

4. The computer implemented method of claim 1, further comprising updating an identity of the highly requested content by gathering usage data from a network data analytics function.

5. A device for edge computing, comprising:
   a display,
   a processor, and a memory that stores executable instructions that when executed by the processor, perform operations comprising:
   identifying highly requested content at an access point;
   tunneling to at least one application server to download the highly requested content;
   storing the highly requested content near the access point, wherein the highly requested content is stored in a dynamic caching server; and
   dynamically flushing the dynamic caching server of the highly requested content when a number of requests for the highly requested content falls below a predetermined threshold.

6. The device of claim 5, wherein dynamically flushing the dynamic caching server occurs on a periodic basis.

7. The device of claim 5, wherein the predetermined threshold is based on a number of requests for the highly requested content.

8. The device of claim 5, wherein the predetermined threshold is based on an expiration of a time period.

9. The device of claim 5, further comprising updating an identity of the highly requested content by gathering data from a network data analytics function.

10. A system for edge computing in a mobile network, the system comprising:
    a processor; and
    one or more computer storage hardware devices storing computer-useable instructions that, when used by the processor, cause the processor to:
    identify highly requested content at an access point;
    tunnel to at least one application server to download the highly requested content;
    store the highly requested content near the access point, wherein the highly requested content is stored in a dynamic caching server; and
    dynamically flushing the dynamic caching server of the highly requested content when a number of requests for the highly requested content falls below a predetermined threshold.

11. The system of claim 10, wherein the predetermined threshold is based on a number of requests for the highly requested content.

* * * * *